United States Patent [19]

Jaspers et al.

[11] 3,859,240
[45] Jan. 7, 1975

[54] PASTES FOR USE IN HARDENING PUTTIES CONTAINING ORGANIC PEROXIDES

[76] Inventors: Hans Jaspers, Burg Arriensweg 12, Diepenveen; Reinder Torenbeek, Van Hogendorpstraat 22, Twello, both of Netherlands

[22] Filed: Nov. 8, 1973

[21] Appl. No.: 413,765

Related U.S. Application Data

[62] Division of Ser. No. 194,700, Nov. 1, 1971, Pat. No. 3,806,477.

[30] Foreign Application Priority Data

Nov. 2, 1970 Netherlands...................... 7015982

[52] U.S. Cl.. 260/29.6 R, 260/29.6 XA, 260/42.42, 260/42.46, 260/42.49, 260/42.55
[51] Int. Cl........................ C08f 45/04, C08f 45/72
[58] Field of Search.... 260/29.6 R, 29.6 XA, 42.42, 260/42.43, 42.46, 42.49, 42.55

[56] References Cited
UNITED STATES PATENTS

| | | | |
|---|---|---|---|
| 2,413,323 | 12/1946 | Hills.................................... | 222/107 |
| 3,425,980 | 2/1969 | Baum............................ | 260/42.42 X |
| 3,806,477 | 4/1974 | Jaspers et al...................... | 260/17 R |

*Primary Examiner*—Lucille M. Phynes
*Attorney, Agent, or Firm*—Clelle W. Upchurch

[57] ABSTRACT

A composition in the form of a paste, for hardening putties, comprising a ketone peroxide, a phlegmatiser, a gelforming colloid, and an insoluble synthetic organic polymer or copolymer. Preferably, the polymer of copolymer has a particle size of $\leq 300\mu$. The gelforming colloid comprises a cellulose derivative, and one or more coloring agents, pigments, sequestering agents for anti-oxidants may be present. The composition is conveniently packaged in a collapsible tube.

8 Claims, No Drawings

PASTES FOR USE IN HARDENING PUTTIES CONTAINING ORGANIC PEROXIDES

CROSS REFERENCE TO RELATED APPLICATION

This is a divisional of application Ser. No. 194,700, filed Nov. 1, 1971, now U.S. Pat. No. 3,806,477, patented Apr. 23, 1974.

This invention relates to compositions in the form of pastes containing ketone peroxides, which are capable of hardening putty-like materials. These pastes are especially useful as they can be packaged in, and dispensed as required from, collapsible tubes.

Heretofore, putties based upon unsaturated polyesters have been hardened, e.g., by the admixture of cyclohexanone peroxides. In order to obtain an accurate measuring or dosage of the peroxide hardener into the putty to be hardened and their mixture together, these peroxides are not usually added as such, but as a paste which is packaged in a conventional collapsible tube, the dosage being controlled by squeezing out the paste to a given length from the tube. These pastes consist of a mixture of cyclohexanone peroxides in suitable phlegmatisers. Suitable phlegmatisers are, e.g., phthalate plasticisers, such as dibutyl phthalate, polymeric plasticisers, such as polyethylene glycol phthalate, and water.

These pastes have the disadvantage that the cyclohexanone peroxides do not gel and harden the putty fast enough. Consequently, there is a considerable difference in time between the addition of the paste and the moment at which the resin is hardened sufficiently to be fashioned further, and this is economically unattractive.

In addition to cyclohexanone peroxides, other ketone peroxides are known, which are derived from aliphatic ketones having a carbon chain of 3–10 C-atoms, e.g., methyl ethyl ketone, methyl isobutyl ketone, methyl amyl ketone, $\beta$-diketones having 5–10 C-atoms, e.g., acetyl-acetone, and hydroxy ketones having 3–10 C-atoms, e.g., diacetone alcohol. These peroxides cause faster jellification and hardening of unsaturated polyester resins that cyclohexanone peroxides in paste form. However, these other peroxides have not previously been incorporated into pastes, and, for this reason, these peroxides have been marketed as solutions in the usual phlegmatisers.

British Pat. No. 1,092,963 describes a formulation of a peroxide derived from acetyl-acetone, consisting of the peroxide, an organic liquid having a considerable solubility in water and, if desired, water. Organic liquids which are mentioned include alkanols, glycols, ethers, ketones, esters, heterocyclic amides and heterocyclic alcohols. In order to increase the viscosity, thickening agents may be incorporated in the formulations. By the addition of these thickening agents, a paste may be obtained which, however, is granular and decomposes both physically by way of segregation and chemically with the formation of gas.

Consequently, there is still a need in technology for a homogeneous paste which is dosable or measurable from a conventional collapsible tube and which contains a ketone peroxide, and which causes a faster jellification and hardening of unsaturated polyester resin putties than the materials now known and available for this purpose.

It has now been found in accordance with the present invention that such a paste may be obtained by mixing a ketone peroxide, a phlegmatiser and, if desired, water with such a quantity of a gel-forming colloid and an insoluble, synthetic, organic polymer or copolymer that a homogeneous paste is obtained.

In principle, any synthetic organic polymers or copolymers which are insoluble may be incorporated into the paste. However, the polymers or copolymers should be pulverulent or capable of being ground to powders having a particle-size $\leq 300\mu$. The preferred polymers or copolymers are those of vinyl monomers such as polyvinyl chloride, polyethylene, polystyrene and polyacrylates, as these polymers are readily available on the market as powders with the particle-size desired. In addition, polycarbonates, polyesters and copolymers thereof may be used. The quantities may vary over wide limits. Quantities from 5% to 60% by weight, preferably from 15% to 40% by weight, calculated on the total weight of the paste, are usually sufficient.

The gel-forming colloids preferably used include cellulose ethers, such as methyl cellulose, ethyl cellulose, carboxymethyl cellulose, hydroxy ethyl cellulose, hydroxy propyl cellulose, ethyl hydroxy butyl cellulose and ethyl hydroxy ethyl cellulose; cellulose esters such as cellulose acetate; and other cellulose derivatives such as cellulose acetobutyrate.

Furthermore, polyvinyl alcohol, polyvinyl acetate, polyvinyl pyrrolidone, silica aerogels and resins soluble in water and polar solvents, such as carbovinyl polymers, may also be incorporated in the pastes.

The gel-forming colloids may be incorporated in the pastes in quantities from 0.1% to 10% by weight, preferably from 1% to 5% by weight, calculated on the total weight of the paste.

If desired, coloring agents or pigments which are inert with respect to the peroxides incorporated therein, e.g., benzidine yellow, perylenetetracarboxylic acid pigment and phthalocyanine coloring agents, may be included in the paste and, if desired, also sequestering agents and anti-oxidants.

The pastes may be prepared with the aid of the usual apparatus such as Nauta-mixers or planetary mixers.

In principle, all ketone peroxides may be formulated as pastes according to this invention, particularly, however, acetyl acetone peroxide, methyl ethyl ketone peroxide and methyl isobutyl ketone peroxide.

The preferred phlegmatisers include phthalic plasticisers such as dimethyl, diethyl, dibutyl and butylbenzyl phthalate and other esters with a low volatility such as tricresyl phosphate, triethyl phosphate, dibutyl fumarate, dioctyl adipate and polyglycol phthalate. Furthermore, polyhydroxy compounds including glycerol and glycols such as ethylene glycol, propylene glycol, diethylene glycol, dipropylene glycol and the ethers, esters and ether esters derived therefrom and also polyethylene glycol, polypropylene glycol and also ethers, esters, or ether esters derived therefrom may be used.

Preferred solvents include water, ketones, alcohols, esters and other inert solvents which are miscible with the phlegmatisers chosen and which dissolve the peroxide, but not the polymer used.

The putties to be hardened with the pastes according to this invention may be used for filling up dents in coach-work, pointing tiles, filling holes and cracks in floors and walls, and for filling and flattening rough surfaces. Hardening usually takes place in the presence of accelerators. Preferably, however, a cobalt accelerator, such as cobalt naphthenate, cobalt isooctoate and cobalt iso-nonanoate, is selected.

The following examples will illustrate the invention.

EXAMPLE I

In a stainless steel conical screw mixer of 2 liters capacity, 1320 g of a peroxide solution containing, in % by weight:

| 30% acetyl acetone peroxide | |
|---|---|
| 45% diacetone alcohol | ) |
| 8% diethylene glycol | ) phlegmatiser |
| 17% water | ) | were mixed with stirring with 50 g of hydroxy-ethyl cellulose having a substitution degree of 2.5 and an average number of moles of ethylene oxide per anhydroglucose unit of 2.5 (as thickening agent), and with 630 g of polyvinyl chloride having a particle-size <40μ.

After a few minutes, the mixture started to thicken and then the stirring was stopped.

A homogeneous paste was obtained, having an active oxygen-content of 2.44%. After storage for 60 days at room temperature, no external changes could be observed and the active oxygen-content amounted to 2.38%.

EXAMPLE II

In a stainless steel conical screw mixer of 2 liters capacity, 1,200 g of a 50% by weight solution of methyl ethyl ketone peroxide in dimethyl phthalate were mixed with 80 g of colloidal silicon oxide as thickening agent and 720 g of polyvinyl chloride having a particle-size <200μ. After stirring intensively for 10 minutes, a homogeneous paste was obtained having an active oxygen-content of 5.59%. After storage for 60 days at room temperature, this content amounted to 5.42%.

EXAMPLE III

In a stainless steel planetary mixer of 5 liters capacity, 2,220 g of a peroxide solution containing, in % by weight:

| 27.5% acetyl acetone peroxide | |
|---|---|
| 40.0% diacetone alcohol | ) |
| 6.5% diethylene glycol | ) phlegmatiser |
| 11.0% 1,2-propane diol | ) |
| 15.0% water | ) | were mixed with 60 g of hydroxy butyl methyl ether of cellulose as a thickening agent, and 720 g of polyethylene having a particle-size between 100 and 200μ.

A homogeneous paste was obtained having an active oxygen-content of 2.42%. After storage for 60 days at room temperature, this content amounted to 2.31%.

EXAMPLE IV 500 g of the paste prepared according to Example III were mixed intimately with 0.375 g of a perylene tetracarboxylic acid pigment (PV Echt Rot B). The homogeneous red paste thus obtained had an active oxygen-content of 2.41%. After storage for 60 days at room temperature, this content amounted to 2.34%.

In an analogous way, 500 g of the paste prepared according to Example III were mixed with 1.25 g of a benzidine yellow derivative (PV Gelb H 10 G). The yellow-colored paste had an active oxygen-content of 2.39%. After storage for 60 days at room temperature, this content amounted to 2.36%.

EXAMPLE V

In a stainless steel conical screw mixer, 1400 g of a peroxide solution containing, in % by weight:

25% cyclohexanone peroxide
 27.5% methyl cyclohexanone peroxide
 42.5% triethyl phosphate as phlegmatiser were mixed intensively with 100 g of colloidal silicon oxide and 500 g of pulverulent polyethylene having a molecular weight of about 2,000. A homogeneous paste was obtained having an active oxygen-content of 4.44%. After storage for 60 days at room temperature, no external change was observed and the active oxygen-content amounted to 4.28%.

EXAMPLE VI 2 g of a solution of cobalt-2-ethyl-hexoate in white spirit (Co-content 10%) were added to 250 g of a putty containing, in % by weight:

40% unsaturated polyester resin
 38% chalk
 18% talc
 2.8% titanium dioxide
 1.2% colloidal silica and then the putty was hardened at 20°C. with 2 g of cyclohexanone peroxide paste containing equal amounts by weight of peroxide and dibutyl phthalate. The active oxygen-content of the paste amounted to 6.5%. Consequently 0.13 g of active oxygen was measured into the paste.

In an analogous way, 250 g of the same putty were hardened with peroxide pastes according to Examples I, II, and V. The quantity of paste added each time was such that 0.13 g of active oxygen was measured into the putty.

The gel time of the unsaturated polyester resin was measured and also the Shore A hardness 85 according to NEN 5601.

The results obtained are tabulated hereafter:

| Peroxide paste | Time in min. at 20°C. | |
|---|---|---|
| | Jellification | Hardness |
| cyclohexanone peroxide | 16 | 42 |
| methyl ethyl ketone peroxide (according to Ex. II) | 10 | 38 |
| acetyl acetone peroxide (according to Ex. I) | 6 | 18 |
| cyclohexanone peroxide (according to Ex. V) | 7 | 38 |

What is claimed is:

1. A paste for use in hardening putties consisting essentially of, in approximate parts by weight:
   a. 10–50 parts of a ketone peroxide;
   b. 20–70 parts of one or more, plasticizers inert to the ketone peroxide, organic solvents inert to the ketone peroxide or water;
   c. 0.1–10 parts of silicon dioxide; and
   d. 5–60 parts of synthetic organic polymer of an ethylenically unsaturated monomer having a particle size of less than 300 microns which is insoluble in the paste.

2. The composition of claim 1 wherein component (d) is a vinyl polymer or copolymer.

3. The composition of claim 2 wherein the vinyl polymer comprises polyvinyl chloride.

4. The composition of claim 1 wherein the component (d) is polyethylene.

5. The composition of claim 1 containing from 15% to 40% of component (d).

6. The composition of claim 1 containing from 1 – 5% by weight silicon dioxide.

7. The composition of claim 1 containing one or more coloring agents, pigments, sequestering agents or antioxidants.

8. A process for making the composition of claim 1 which comprises mixing components (a), (b), (c) and (d) together to form a homogeneous paste.

* * * * *